US012377766B2

(12) United States Patent
Göbbels

(10) Patent No.: US 12,377,766 B2
(45) Date of Patent: Aug. 5, 2025

(54) ARMREST ARRANGEMENT FOR A VEHICLE SEAT STRUCTURE OF A MOTOR VEHICLE

(71) Applicant: BOS GmbH & Co. KG, Ostfildern (DE)

(72) Inventor: Andreas Göbbels, Kürten (DE)

(73) Assignee: BOS GMBH & CO. KG, Ostfildern (DE)

(*) Notice: Subject to any disclaimer, the term of this patent is extended or adjusted under 35 U.S.C. 154(b) by 178 days.

(21) Appl. No.: 17/822,974

(22) Filed: Aug. 29, 2022

(65) Prior Publication Data

US 2023/0085810 A1 Mar. 23, 2023

(30) Foreign Application Priority Data

Sep. 23, 2021 (DE) .................. 102021210644.7

(51) Int. Cl.
B60N 2/75 (2018.01)
B60N 2/42 (2006.01)
B60N 3/10 (2006.01)

(52) U.S. Cl.
CPC ............. B60N 2/753 (2018.02); B60N 2/43 (2013.01); B60N 2/79 (2018.02); B60N 3/10 (2013.01)

(58) Field of Classification Search
CPC .......... B60N 2/753; B60N 2/43; B60N 2/757; B60N 2/79
See application file for complete search history.

(56) References Cited

U.S. PATENT DOCUMENTS

| 2014/0319868 | A1* | 10/2014 | von Rothkirch und Panthen ....... B60N 2/43 296/24.34 |
| 2016/0297334 | A1* | 10/2016 | Salenbien .............. B60N 2/919 |
| 2018/0065520 | A1* | 3/2018 | Aktas .................... B60N 2/433 |
| 2020/0130550 | A1* | 4/2020 | Stewart ................. B60N 2/753 |
| 2020/0307415 | A1 | 10/2020 | Maruoka et al. |

FOREIGN PATENT DOCUMENTS

| CN | 103935274 A | 7/2014 |
| CN | 112638706 A | 4/2021 |
| DE | 102017221768 A1 | 6/2019 |
| DE | 102019208069 A1 | 12/2020 |
| WO | 2019110286 A1 | 6/2019 |

OTHER PUBLICATIONS

Chinese Office Action issued in corresponding Chinese Application No. 202211164496.7 dated Apr. 7, 2025 (6 pages).

* cited by examiner

Primary Examiner — David R Dunn
Assistant Examiner — Tania Abraham
(74) Attorney, Agent, or Firm — FLYNN THIEL, P.C.

(57) ABSTRACT

An armrest arrangement having a support structure secured to a vehicle and having two carrier arms supported so as to be pivotably movable relative to the support structure about a pivot axis, and having a blocking device acting between the support structure and at least one carrier arm and activated by a mechanical control unit to block a pivot movement of the carrier arm. The control unit cooperates with the blocking device, depending on an acceleration or speed of the pivot movement. The support structure has, for each carrier arm, an axle carrier continuation on which one of the two carrier arms is pivotably moveably supported. The two axle carrier continuations have respective carrier arms spaced apart from each other along the pivot axis.

15 Claims, 14 Drawing Sheets

ARMREST ARRANGEMENT FOR A VEHICLE SEAT STRUCTURE OF A MOTOR VEHICLE

CROSS-REFERENCE TO RELATED APPLICATION

This claims priority from German Application No. 10 2021 210 644.7, filed Sep. 23, 2021, the disclosure of which is hereby incorporated by reference in its entirety.

TECHNICAL FIELD

The invention relates to an armrest arrangement for a vehicle seat structure of a motor vehicle having a—in the operationally completely mounted state—support structure which is secured to the vehicle and having two carrier arms which are supported so as to be pivotably movable relative to the support structure about a pivot axis, and having a blocking device which acts between the support structure and at least one carrier arm and which can be activated by means of a mechanical control unit in order to block a pivot movement of the carrier arm, wherein the control unit cooperates with the blocking device, depending on an acceleration or speed of the pivot movement.

BACKGROUND AND SUMMARY

Such an armrest arrangement is known from DE 10 2019 208 069 A1. The armrest arrangement is configured as a central armrest of a rear bench type seat of a passenger vehicle. The armrest arrangement has an armrest member which is secured to two carrier arms which are supported so as to be pivotably movable on a bearing axle which extends over the width of the armrest arrangement. The bearing axle is part of a support structure which in the operationally completely mounted state is secured to a stationary vehicle support portion. The armrest arrangement is provided with a crash protection means which comprises a controllable locking element. The locking element can be controlled by means of a mechanical control unit in accordance with a speed and/or an acceleration of a pivot movement of the armrest member and consequently of the carrier arms. FIG. 14 of DE 10 2019 208 069 A1 discloses a variant of the armrests in which, in place of a continuous bearing axle, two separate bearing axle stubs with which a carrier arm is associated in each case are provided. In order to reinforce the two carrier arms relative to each other, the two carrier arms are connected to each other in a rigid manner by means of a cross-member.

An object of the invention is to provide an armrest arrangement of the type mentioned in the introduction which enables variable applications.

This object is achieved in that the support structure for each carrier arm in each case has an axle carrier continuation or carrier element on which one of the two carrier arms is supported in a pivotably movable manner in each case, and in that the two axle carrier continuations are including the respective carrier arms spaced apart from each other in a manner separated from each other along the pivot axis. As a result of the solution according to the invention, there is no supporting connection between the carrier arms or the axle carrier continuations. It is thereby possible to be able to position the opposing carrier arms with different spacings with respect to each other without impairing the function of the mechanical control unit or the blocking device. The armrest arrangement according to the invention can thereby be adapted in a simple manner to different vehicle types without a change of the functional components which are significant for a pivot movement of the armrest arrangement and for crash protection of the armrest arrangement. Armrest members of different widths can be secured to the carrier arms in a simple manner. A transverse connection between the carrier arms is achieved simply by placing an armrest member on, or by connection of another comfort functional component to, the two carrier arms. The width of a corresponding comfort functional component, such as, in particular, a cup holder unit or an armrest member, can be adapted to the corresponding vehicle type. The carrier arms are accordingly mounted with an adapted spacing with respect to each other at the vehicle side by means of the two axle carrier continuations.

In one embodiment of the invention, the control unit and the blocking device are accommodated in a module housing which is associated with a first of the two carrier arms and which is spaced apart with respect to the opposing second carrier arm. The module housing encloses the mechanical control unit and the blocking device relative to the carrier arm so that it is ensured that the corresponding functional components are free from contamination.

In another embodiment of the invention, the second carrier arm is provided with a blocking device which is similar to the blocking device for the first carrier arm and which is coupled by means of a synchronization axis to the blocking device of the first carrier arm, wherein the synchronization axis extends with radial spacing from the pivot axis for the carrier arms and parallel therewith. The crash safety of the armrest arrangement is thereby further increased since a blocking device is provided both for the first and for the second carrier arm. Both blocking devices are synchronized with each other and consequently can be controlled together by means of an individual mechanical control unit.

In another embodiment of the invention, there is associated with the second carrier arm a housing enclosure which surrounds the blocking device and which is spaced apart with respect to the module housing of the first carrier arm. The functional components of both carrier arms are thereby enclosed and consequently accommodated in a protected manner. The housing enclosure and the module housing are separated from each other and are mutually independent components.

In another embodiment of the invention, the mechanical control unit has a stepping gear mechanism, in particular in the form of a Geneva gear mechanism, which brings about a stepped pivot path transmission of the carrier arm to the blocking device. This embodiment is, on the one hand, particularly structural-space-saving and, on the other hand, particularly functionally reliable.

In another embodiment of the invention, the stepping gear mechanism is in the form of a stepping gear mechanism segment and is active over a pivot range of up to 90°. A further structural space reduction is thereby achieved without impairing the function of the control unit and the blocking device. The configuration is based on the recognition that an armrest member of an armrest arrangement according to the invention has only a limited pivot range between a substantially vertical rest position and a substantially horizontal functional position. The present embodiment makes use of this recognition.

In another embodiment of the invention, there is arranged downstream of the stepping gear mechanism segment a step-up gear mechanism segment which brings about over the pivot range of the stepping gear mechanism segment an increase of a rotation speed of a functional component associated with the blocking device. This embodiment is also structural-space-saving and enables a cost-effective production of the corresponding functional components.

In another embodiment of the invention, the step-up gear mechanism segment is formed by means of spur gear segments which mesh with each other and which are configured in such a manner that a speed step-up is achieved. The spur gear segments enable a production with reduced costs. In addition, there is a saving of structural space.

In another embodiment of the invention, an inertia coupling which is operationally connected to the blocking device is arranged downstream of the step-up gear mechanism segment. The inertia coupling switches into a rest mode as soon as a high acceleration is applied to the carrier arms as a result of a vehicle impact. This brings about an activation of the blocking device which, during normal pivot movements of the armrest member and consequently of the carrier arms, remains in a release position by means of manually raising or lowering the armrest member.

In another embodiment of the invention, the inertia coupling is associated with a slotted control member for a pivotably movable deflection of a blocking lever which has a blocking element which, depending on movement transmissions of the control unit, blocks or releases the at least one carrier arm for a pivot movement relative to the support structure. The blocking lever is associated with the carrier arm with which the mechanical control unit is also associated.

In another embodiment of the invention, the blocking element is associated with the first carrier arm. The blocking element is preferably a cylindrical steel bolt which in the blocking position blocks a pivot movement of the first carrier arm relative to the support structure.

In another embodiment of the invention, a similarly pivotably movable blocking lever having a blocking element which is associated with the second carrier arm is articulated to the second carrier arm and the synchronization axis couples the blocking lever of the second carrier arm parallel with a lever axis of the blocking lever of the first carrier arm to this blocking lever in a rotationally secure manner. The rotationally secure coupling of the two blocking levers for the two carrier arms brings about a simultaneous blocking or release of both carrier arms and consequently a particularly good low-torsion crash protection for an armrest member which is connected to the carrier arms.

In another embodiment of the invention, at least one blocking lever is associated with a top dead center spring which applies to the blocking lever in an intermediate position a torque in the direction of the blocking position or in the direction of the release position, respectively, depending on a dead center position of the intermediate position being reached. It is thereby ensured that the blocking lever is reliably guided into one of the two end positions thereof. This enables either a secure blocking of a pivot movement of the carrier arms or a secure release of a pivot movement of the carrier arms.

In another embodiment of the invention, at least one axle carrier continuation has a stop which protrudes radially with respect to the pivot axis and which the blocking element of the associated blocking lever strikes or pivots past depending on the pivot position of the blocking lever. The stop is formed integrally on the axle carrier continuation. The axle carrier continuation is advantageously in the form of a metal component, in particular a steel component. The blocking element of the blocking lever of the first carrier arm acts on the stop of the axle carrier continuation which carries the first carrier arm. When a second blocking lever is present, the blocking element of the second blocking lever acts on a stop of the second axle carrier continuation which carries the second carrier arm.

In another embodiment of the invention, at least one carrier arm has an end position catch which acts in a force-limited manner and which is in particular resiliently flexible, and which in at least one end position of the carrier arm forms an end position securing means of the carrier arm. The end position catch is configured in such a manner that in order to move the carrier arm and consequently also the associated armrest member into the respective end position, an increased application of force which signals to an operator that the end position is reached is required. In a similar manner, an operator also identifies with a reversed movement direction from the end position into an intermediate position as a result of the increased application of force that the armrest member has left the end position.

Other advantages and features of the invention will be appreciated from the following description of a preferred embodiment of the invention which is illustrated with reference to the drawings.

BRIEF DESCRIPTION OF THE DRAWINGS

FIG. 6b shows another perspective illustration of a part-region of the mechanical control unit and the blocking device according to FIGS. 5 and 6a;

FIG. 10 shows another perspective illustration of the part-region of the support structure according to FIGS. 5 and 6a;

DETAILED DESCRIPTION

A passenger vehicle which is not illustrated has in a vehicle interior a rear bench type seat which is provided with an armrest arrangement 1 according to FIGS. 1 to 15 which acts as a central armrest. The armrest arrangement is supported in the region of a backrest of the rear bench type seat so as to be able to be pivotably moved between an operating position which is pivoted substantially horizontally forward and an upright rest position which is integrated in a recess of the backrest arrangement of the rear bench type seat. The arrangement of the armrest arrangement 1 in the region of the rear bench type seat corresponds to the illustration, as illustrated in FIG. 1 of DE 10 2019 208 069.

Figure 1:
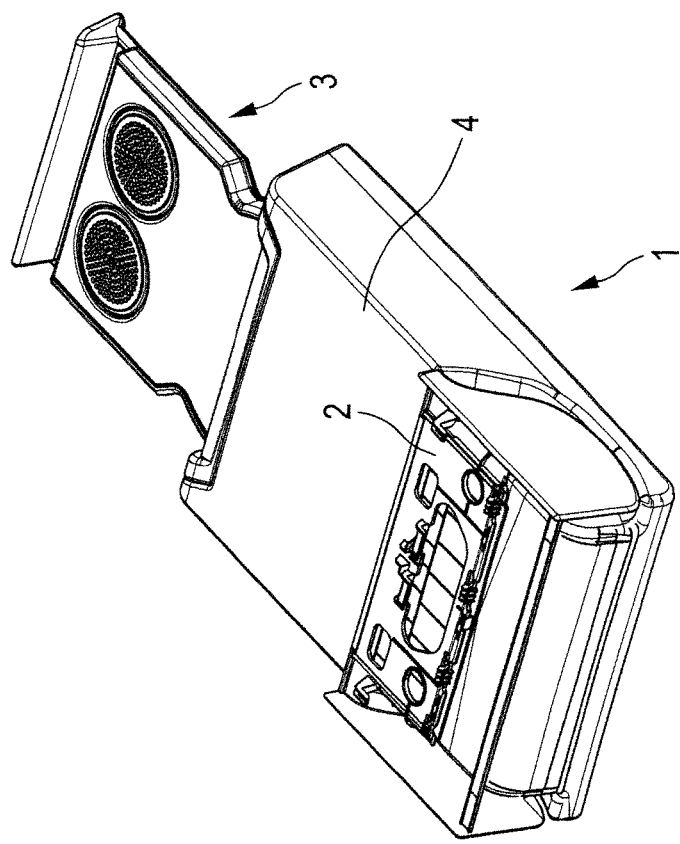
FIG. 1 shows a perspective illustration of an embodiment of an armrest arrangement according to the invention in a state not yet mounted on the vehicle.
Figure 2:
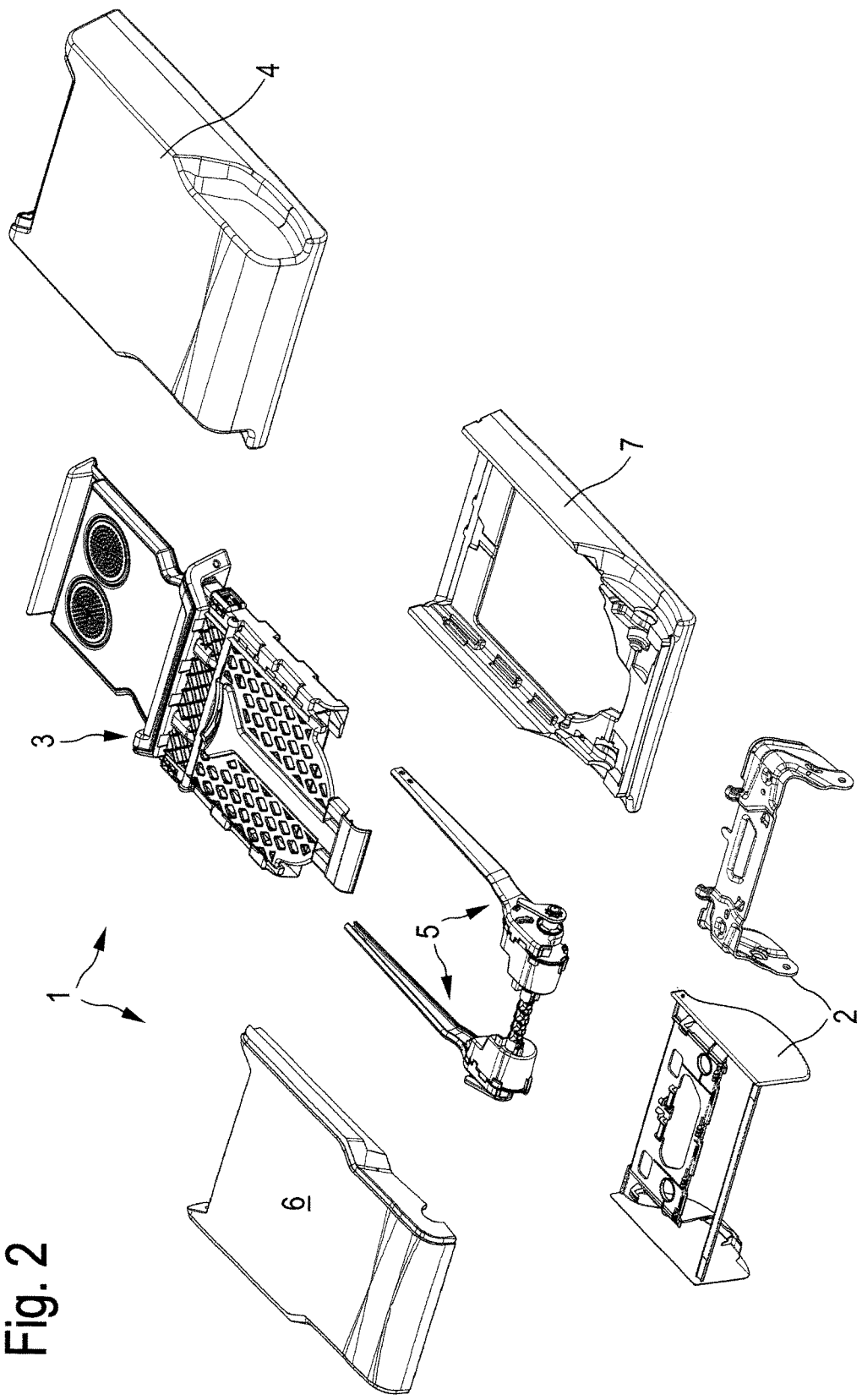
FIG. 2 shows the armrest arrangement according to FIG. 1 as a perspective exploded illustration.
Figure 3:
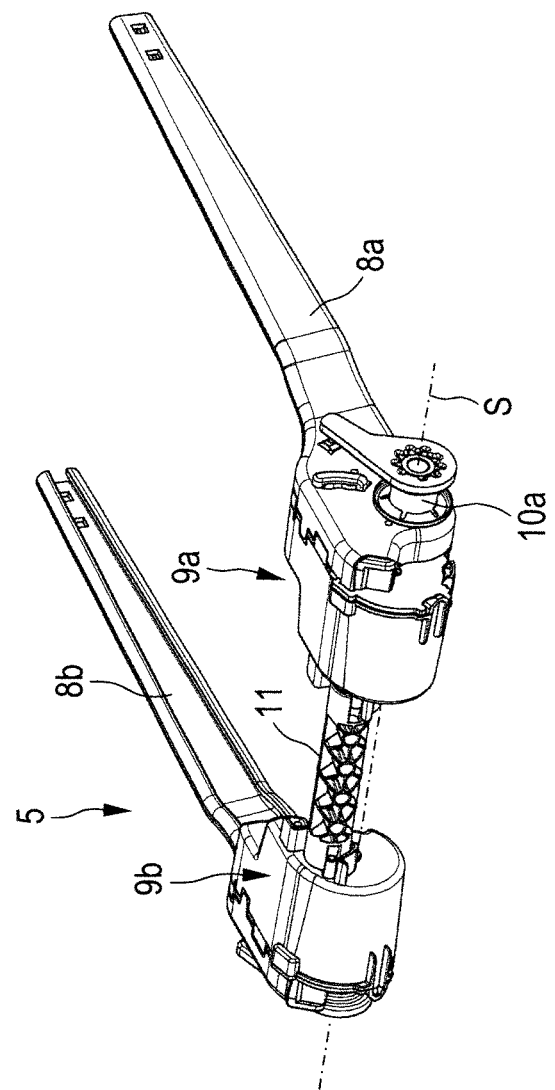
FIG. 3 shows a support structure of the armrest arrangement according to FIGS. 1 and 2 as an enlarged perspective view.

According to FIGS. 1 to 3, the armrest arrangement 1 has a support structure 2 which, in the operationally completely mounted state, is securely connected to a support structure portion of the rear bench type seat on the vehicle. The support structure 2 is consequently in the operationally completely mounted state permanently retained in a state secured to the vehicle.

The armrest arrangement 1 additionally has an armrest member 4 and a cup holder module 3 which are secured to a support structure 5 of the armrest arrangement 1. The cup holder module 3 has cup holder inserts which can be retracted and extended. The cup holder module 3 is flanked at the upper and lower side by support shells 6 and 7 which are also secured to the support structure 5. The armrest member 4 is placed on this intermediate construction and also securely connected to the intermediate construction and/or the support structure 5.

The support structure 5 is supported so as to be able to be pivotably moved relative to the support structure 2 about a pivot axis S which extends, in the operationally completely mounted state, in the transverse vehicle direction, between the lower operating position and the upper rest position of the armrest member 4.

The support structure 2 which is in the form of a sheet steel construction has two bearing flanges which, in the assembled state secured to the vehicle, are spaced apart from each other. An axle carrier continuation or carrier element 10*a*, 10*b* is secured to these bearing flanges in each case, wherein the two axle carrier continuations 10*a*, 10*b* face each other in the assembled state and are orientated coaxially with respect to the pivot axis S. A carrier arm 8*a*, 8*b* is retained in a pivotably movable manner on each of the two axle carrier continuations 10*a*, 10*b*. Both carrier arms 8*a* and 8*b* are in the form of metal components. The axle carrier continuations 10*a* and 10*b* are releasable components of the support structure 2 so that they can also alternatively be secured to bearing flanges of the support structure 2 which, compared with the embodiment illustrated, have a larger or smaller spacing with respect to each other in the transverse vehicle direction. On each stationary axle carrier continuation 10*a*, 10*b*, the associated carrier arm 8*a*, 8*b* is supported so as to be able to be pivotably moved about the pivot axis S. There is associated with the carrier arm 8*a* a functional block which is described in greater detail below and which is illustrated with reference to FIGS. 4 to 13 and which is accommodated in a module housing 9*a*. The module housing 9*a* is positioned at the inner side of the carrier arm 8*a* which faces the opposing carrier arm 8*b* and is securely connected to the carrier arm 8*a*. Consequently, the module housing 9*a* can be pivotably moved together with the carrier arm 8*a*. The carrier arms 8*a* and 8*b* form the support structure 5 in the context of the invention.

There is associated with the opposing carrier arm 8*b* another functional block which will be described in greater detail below and which is enclosed by a housing enclosure 9*b*. The housing enclosure 9*b* is also arranged on the inner side of the carrier arm 8*b* facing the carrier arm 8*a* and securely connected to the carrier arm 8*b* in a rotationally secure manner. As can be clearly seen in FIG. 3, the module housing 9*a* and the housing enclosure 9*b* are spaced apart from each other along the pivot axis S and consequently in the transverse vehicle direction. The functional block which is surrounded by the housing enclosure 9*b* for the carrier arm 8*b* is illustrated in greater detail with reference to FIGS. 14 and 15. In this instance, functionally identical or identical functional components of both functional blocks of the opposing carrier arms 8*a* and 8*b* are given the same reference numerals, sometimes with the addition of the letters a and b, in order to make the associations with the opposing carrier arms 8*a* and 8*b* clear.

As can be seen in FIG. 3, there extends between the two functional blocks which are surrounded by the module housing 9*a*, on the one hand, and the housing enclosure 9*b*, on the other hand, a synchronization axle 11 whose function will be described below. The synchronization axle 11 extends in the mounted state parallel with the pivot axis S and is consequently arranged with radial spacing with respect to the pivot axis S.

The functional block which is accommodated in the module housing 9*a* comprises both a mechanical control unit and a blocking device. The blocking device is provided in the event of a powerful vehicle acceleration, in particular as a result of a vehicle impact, to ensure a blocking of a pivot movement of the support structure 5 in order to prevent the arm support member 4 from being thrown forward in an uncontrolled manner from the rest position thereof in the event of the vehicle impact. The blocking device cooperates in this instance with a stop 26 of the respective axle carrier continuation 10*a*, 10*b*. The stop 26 is formed integrally on the axle carrier continuation 10*a* and protrudes radially with respect to the pivot axis S from the respective axle carrier continuation 10*a*, 10*b*. In the operationally completely mounted state the two stops 26 of the two axle carrier continuations 10*a* and 10*b* are orientated upward in the vertical vehicle direction.

The stops 26 of the two axle carrier continuations 10*a* and 10*b* additionally serve to define the lower end position of the support structure 5, that is to say, the horizontal functional position of the armrest member 4. To this end, each carrier arm 8*a*, 8*b* is provided at the rear side with a stop flange 35 which is formed integrally on the carrier arm 8*a*. This stop flange 35 moves when the carrier arms 8*a*, 8*b* are pivoted downward into positive-locking abutment with the respective stop 26 of the axle carrier continuations 10*a* and 10*b* so that a stable support of the support structure 5 is produced in the operating position.

The blocking device can be activated by means of a mechanical control unit which will be described in greater detail below. The blocking device has in the region of each carrier arm 8*a*, 8*b* a blocking lever 19*a*, 19*b* which is supported so as to be able to be pivotably moved about a lever axis H on the respective carrier arm 8*a*, 8*b* and which carries, eccentrically with respect to the lever axis H, a blocking element 20 which is in the form of a cylindrical metal pin. The two blocking levers 19*a*, 19*b* are supported so as to be able to be pivotably moved about mutually coaxial lever axes H which are orientated parallel with the pivot axis S of the support structure 5. In order to enable a common, synchronized pivot movement of both blocking levers 19a, 19b, the two blocking levers 19a, 19b are coupled to each other by means of the synchronization axle 11 which is placed on a coupling pin 22 of the respective blocking lever in each case. The two coupling pins 22 are formed integrally on the blocking lever 19a, 19b at an inner side facing the other blocking lever 19a, 19b in each case and are in the form of cylindrical continuations. The synchronization axle 11 transmits a pivot movement of the blocking lever 19a as a virtually rigid connection to the opposing blocking lever 19b so that the opposing blocking lever 19b is pivoted in the same manner as the blocking lever 19a. A pivoting movability of the blocking levers 19a, 19b about the lever axis H is limited by circular-arc-like slotted members 28, which are coaxial with respect to the lever axis H, in outer walls of the respective carrier arm 8a, 8b. The blocking element 20 protrudes into the respective slotted member 28. Each carrier arm 8a, 8b additionally has an inner wall which is spaced apart with respect to the outer wall in the direction toward the center of the support structure and is formed by a planar support plate 21 which is securely connected to the carrier arm 8a, 8b. The support plate 21 also has a slotted member 24 which is parallel with the slotted member 28. The support plate 21 is in the same manner as the carrier arm 8a, 8b in the form of a metal component. The blocking element 20 which is in the form of a cylindrical pin protrudes through the inner slotted member 24 and also through the outer slotted member 28 so that, in the event of the pivot movement of the carrier arm 8a, 8b being blocked by the blocking element 20, a stable support between the inner slotted member 24 and the outer slotted member 28 is achieved by the blocking element 20.

For the pivotably movable support of each blocking lever 19a, 19b on the respective carrier arm 8a, 8b, each blocking lever has, on the one hand, a bearing pin 23 and, on the other hand, a bearing pin 29 which protrude outward or inward from opposing sides of the blocking lever 19a, 19b coaxially with respect to the lever axis H. The respective inner bearing pin 23 is supported in a recess of an inwardly facing base of the shell-like module housing 9a or the housing enclosure 9b. The respective outer bearing pin 29 is rotatably supported in a complementary receiving member of the respective support plate 21.

Each blocking lever 19a, 19b is pivotably movable within the limits thereof resulting from the circular-arc-like grooves 24 and 28 about the lever axis H between a rest position and a blocking position. In the rest position, the blocking lever 19a, 19b is pivoted to such an extent that the pin-like blocking element 20 during a pivot movement of the support structure 5 and the carrier arms 8a and 8b does not come into contact with the radially protruding stops 26 of the axle carrier continuations 10a and 10b. Instead, in this rest position, the radial spacing of the blocking elements 20 relative to the pivot axis S is greater than a radial spacing of a radially outer tip of the stops 26 of the axle carrier continuations 10a and 10b. In the blocking position, in contrast, the respective blocking lever 19a, 19b is pivoted so far in the opposite direction that the blocking element 20 has, with respect to the pivot axis S, a shortened radial spacing which leads to the respective blocking element 20 during a pivoting of the carrier arms 8a, 8b from the upwardly pivoted rest position in the direction of the horizontal operating position striking the respective stop 26 so that a pivot movement of the support structure 5, and consequently also of the carrier arms 8a, 8b, is blocked in a positive-locking manner. In the blocking position, both blocking elements 20 of the opposing blocking levers 19a and 19b are effective at the same time so that a particularly stable support of the support structure 5 relative to the stops 26 of the axle carrier continuations 10a of the support structure 2 is produced.

In order to ensure that the blocking device is not activated during a normal manual pivoting, carried out by an operator, of the armrest member 4 from the rest position in the direction of the operating position, the blocking device is associated with a mechanical control unit which will be described in greater detail below. The mechanical control unit is configured in such a manner that the blocking device, during normal pivoting at a normal speed or normal acceleration of the support structure 5, remains in the rest position. If an initial pivoting of the support structure 5 is carried out, but with increased acceleration, the mechanical control unit becomes effective and brings about a decoupling of the blocking device from the pivot movement, whereby the blocking elements 20 are not pivoted into the release position but instead remain in the blocking position.

The mechanical control unit is associated exclusively with the right carrier arm 8a in FIG. 3. It acts directly on the right blocking device of the carrier arm 8a in FIG. 3 and at the same time indirectly by means of the movement transmission by the synchronization axle 11 on the opposing blocking device of the carrier arm 8b. The mechanical control unit has, on the one hand, a stepping gear mechanism and, on the other hand, a step-up gear mechanism which is arranged downstream of the stepping gear mechanism and which steps up a rotational movement of the stepping gear mechanism. The step-up gear is coupled to an inertia coupling which, by means of a control disk 18, brings about a control of the pivot positions of the blocking lever 19. During normal pivot operation of the support structure 5, the inertia coupling is switched to the active state so that an initiated pivot movement of the support structure leads to a necessary pivoting of the blocking lever 19 into the release position. The mechanical control unit is configured in this instance in such a manner that by means of the stepping gear mechanism it activates only the small pivot path of the blocking lever 19 and subsequently, with further pivoting of the support structure 5 as far as the lower end position, retains the blocking lever 19 in the release position.

Figure 4:
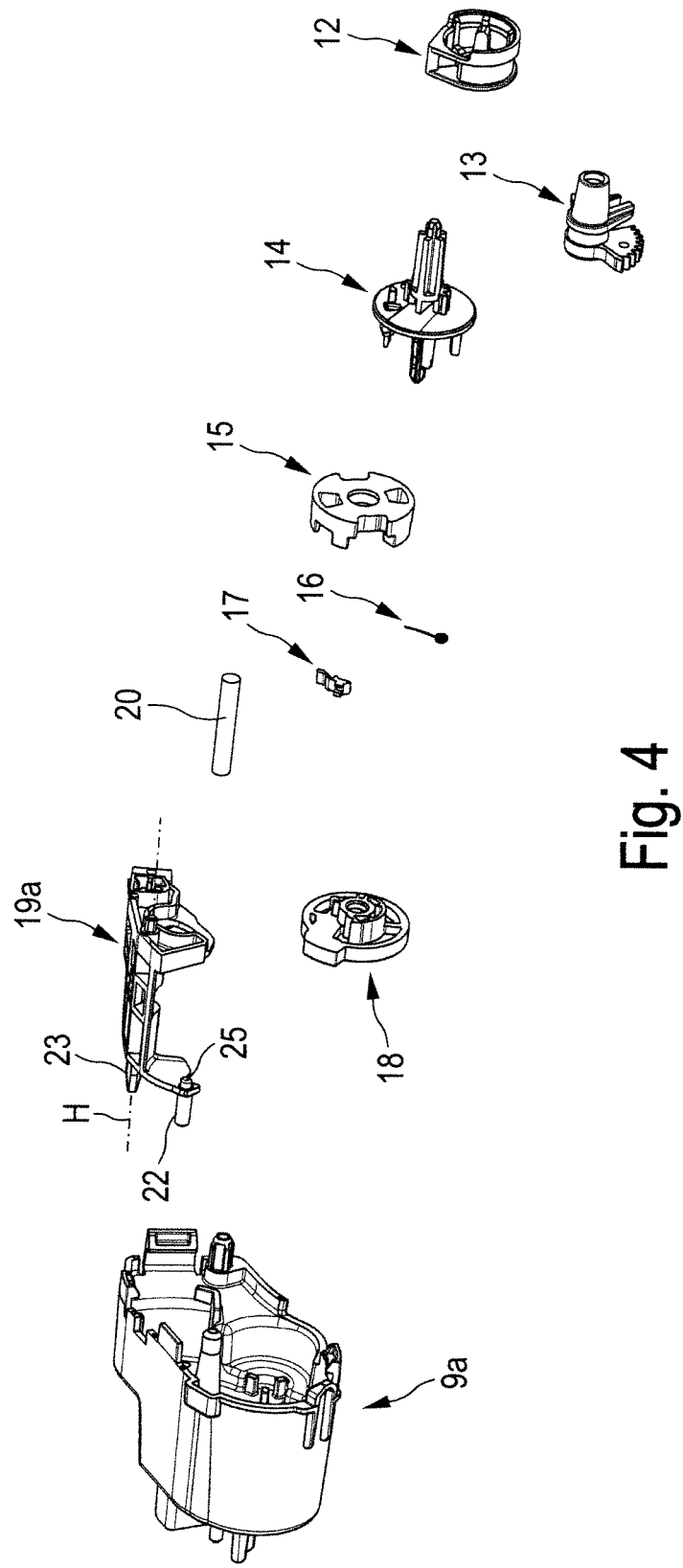
FIG. 4 shows a perspective, exploded illustration of a part-region of the support structure according to FIG. 3 with one carrier arm of the support structure being omitted.
Figure 5:
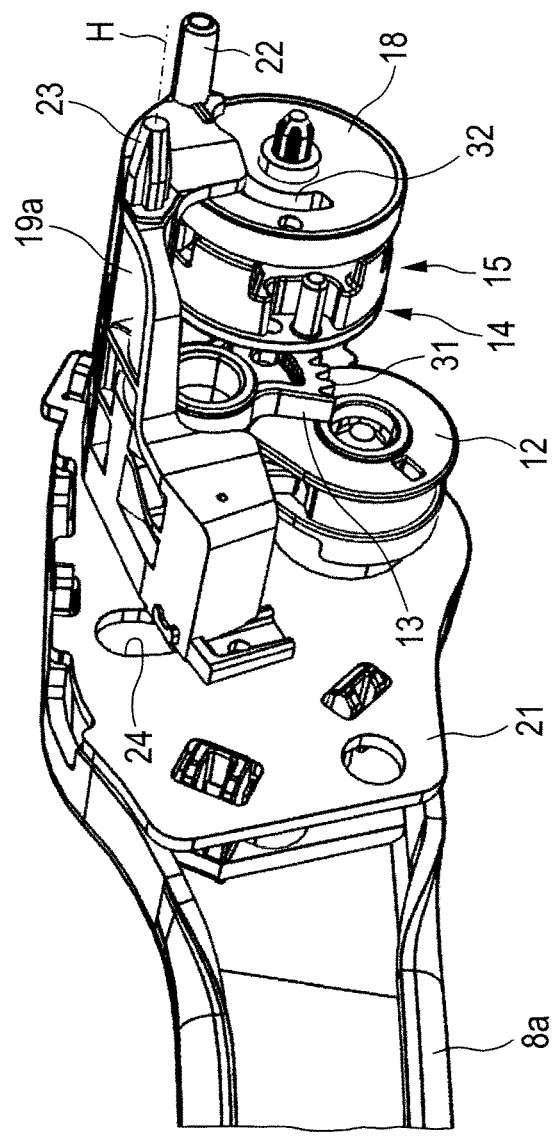
FIG. 5 shows an enlarged perspective illustration of a part-region of the support structure according to FIGS. 3 and 4 in the region of a carrier arm which is provided with a mechanical control device and a blocking device.
Figure 11:
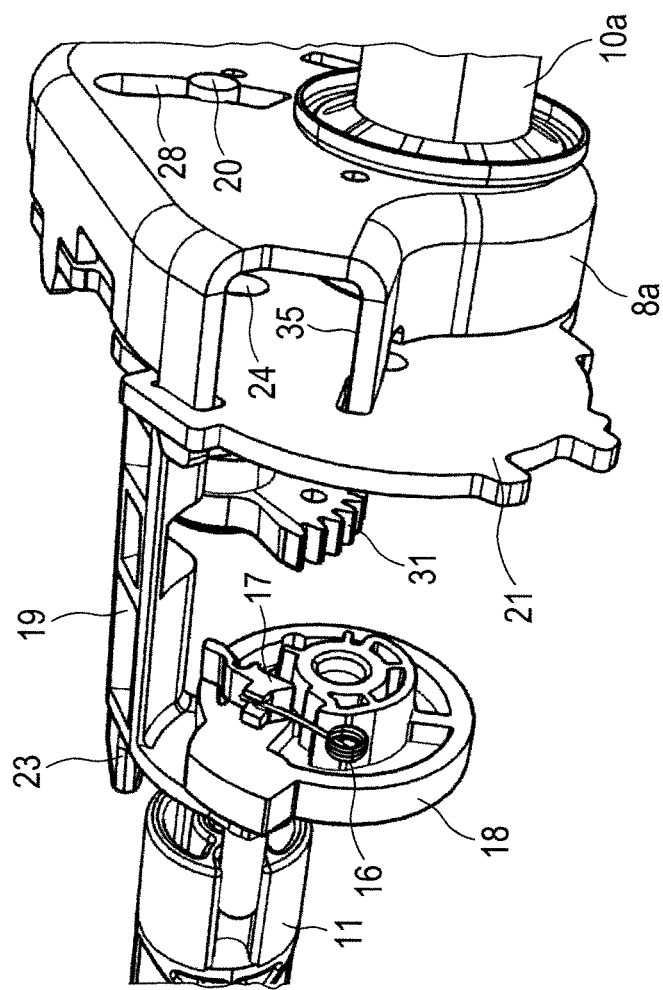
FIG. 11 shows another perspective illustration of additional functional components of the support structure according to FIGS. 3 to 10.
Figure 12:
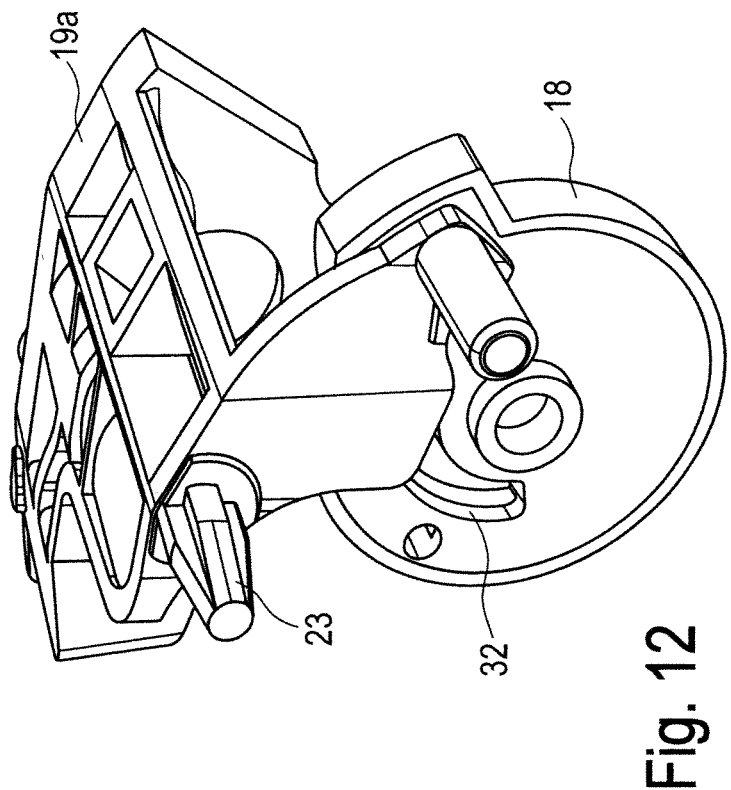
FIG. 12 shows an enlarged perspective illustration of a blocking lever and a control disk of the part-region according to FIGS. 4 to 11.
Figure 13:
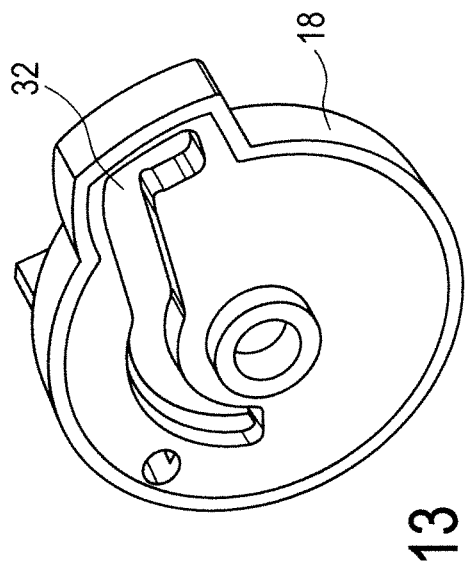
FIG. 13 shows the control disk according to FIG. 12 with the blocking lever according to FIG. 12 being omitted.
Figure 14:
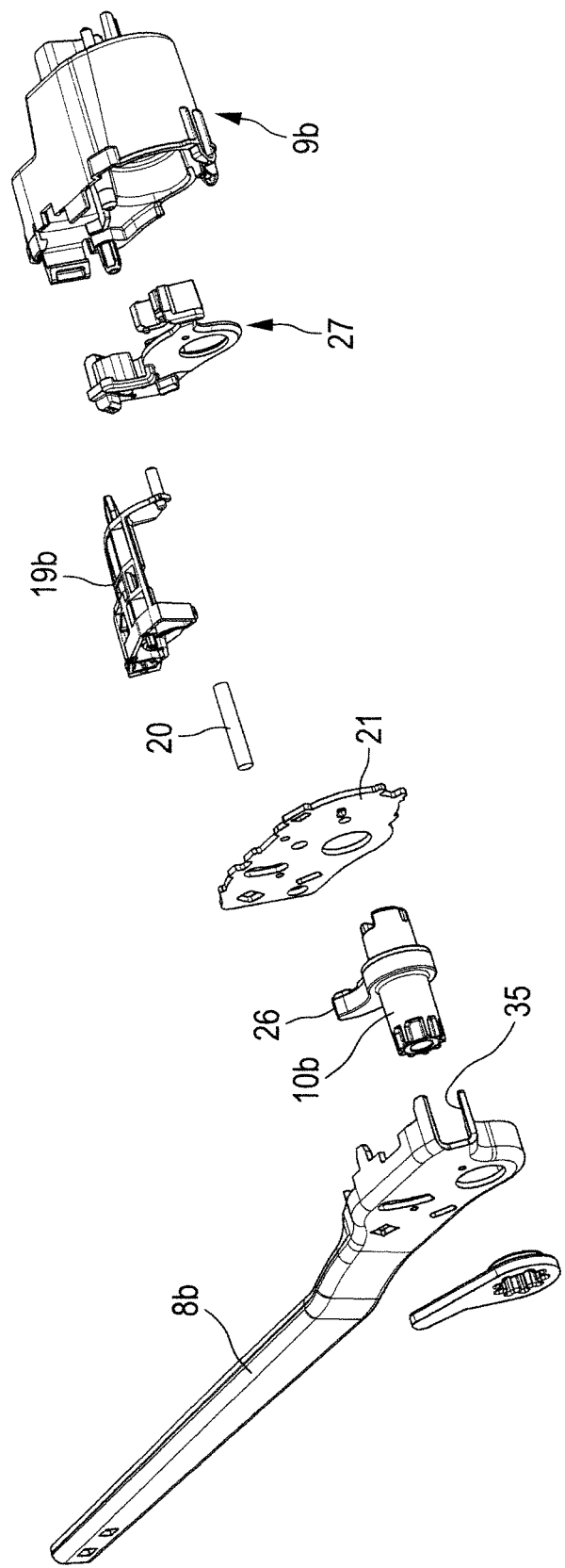
FIG. 14 shows a left part-region in FIG. 3 of the support structure according to FIG. 3 as a perspective, exploded illustration.
Figure 15:
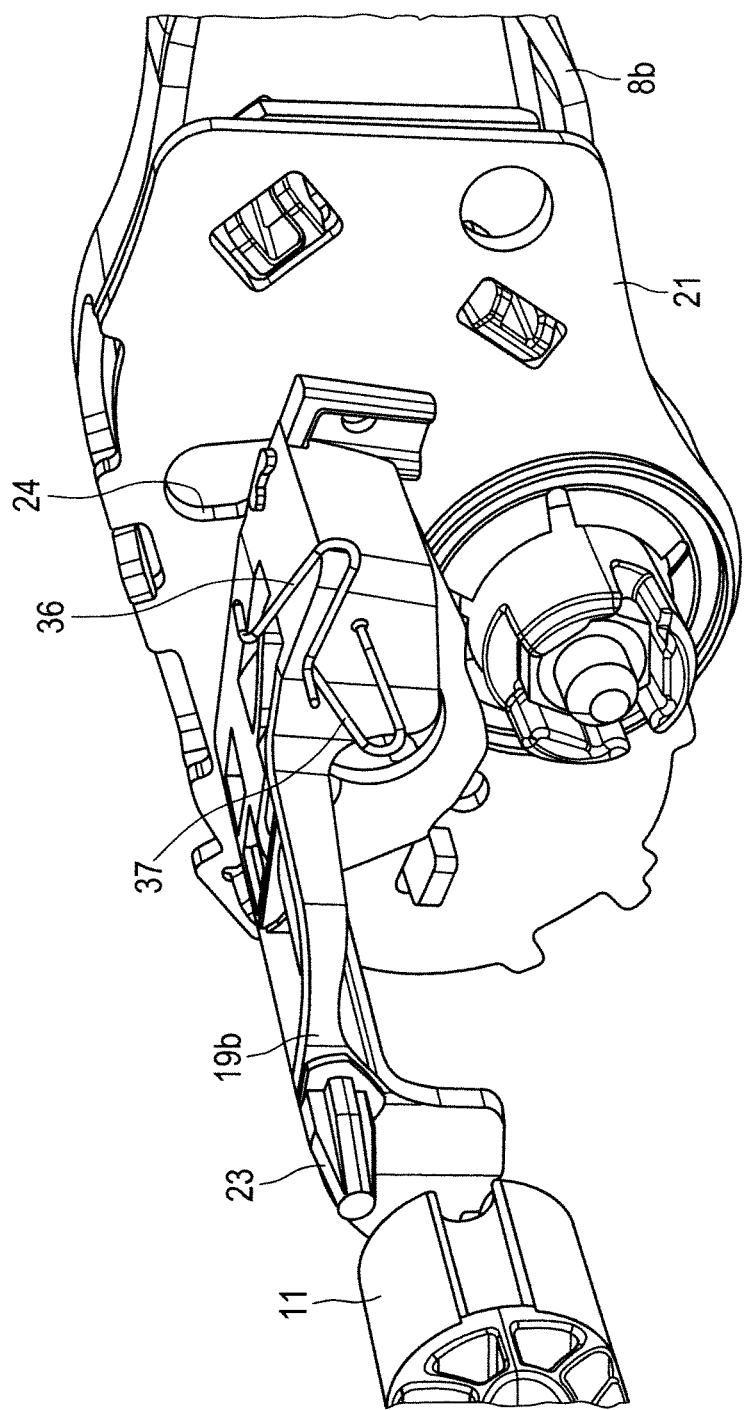
FIG. 15 shows another perspective illustration of the part-region of the support structure according to FIG. 14.

The stepping gear mechanism of the mechanical control unit is, since only a pivot path of less than 90° has to be travelled, in the form of a stepping gear mechanism segment, in this instance in the form of a segment of a Geneva gear mechanism. The Geneva gear mechanism has a control sleeve 12 which is provided with an eccentric pivot pin and a control element 13 which cooperates with the pivot pin and which has a complementary slotted radial member 33 in which the pivot pin is guided. Details of the stepping gear mechanism function can be clearly derived from the drawings. The control element 13 has at the output side a spur gear segment 31 which cooperates with another spur gear segment 30 of a support disc 14 which adjoins in an output direction, as can be seen in FIG. 4. The support disc 14 is connected to a coupling disc 15 of the inertia coupling in a rotationally secure manner. The coupling disc 15 carries an inertial rocker 17 which is acted on by means of a leg spring 16 permanently in the direction of a torque-transmitting coupling position. The inertia coupling corresponds functionally to the inertia coupling as described in DE 10 2019 208 069 A1 so that for further explanation reference may further be made to this document. With reference to FIG. 11, it can be clearly seen that the inertial rocker 17, which is movably supported in a pivotable manner on the coupling disc 15, is in positive-locking engagement with complementary carrier cams of the control disk 18. As soon as a high speed or a high acceleration is applied to the coupling disc, however, a high centrifugal force is applied about the pivot axis thereof to the inertial rocker 17 which pivots a hammer-like engagement portion of the inertial rocker 17 outward counter to the pressure force of the leg spring 16. The inertia coupling thereby switches into rest mode, that is to say, the control disk 18 is no longer coupled to the coupling plate 15 in a rotationally secure manner. The control disk 18 has at the inner side (see FIGS. 5, 7 and 12, 13), that is to say, facing the opposing carrier arm 8b, a slotted control member 32 in which a control pin 25 of the blocking lever 19a permanently engages. The slotted control member 32 consequently brings about in the switching position of the inertia coupling the control of the blocking lever 19a into the release position. As soon as the inertia coupling is in rest mode, the blocking lever 19a, 19b is moved into the blocking position. This is supported by a top dead center spring 36, 37 which engages on at least one of the two blocking levers 19a, 19b (FIG. 15) and which always presses the blocking lever 19a, 19b from undefined intermediate positions into a respective end position. With reference to FIG. 4, the control pin 25 of the blocking lever 19a, which engages in the slotted control member 32 of the control disk 18, can be clearly seen.

Figure 6A:
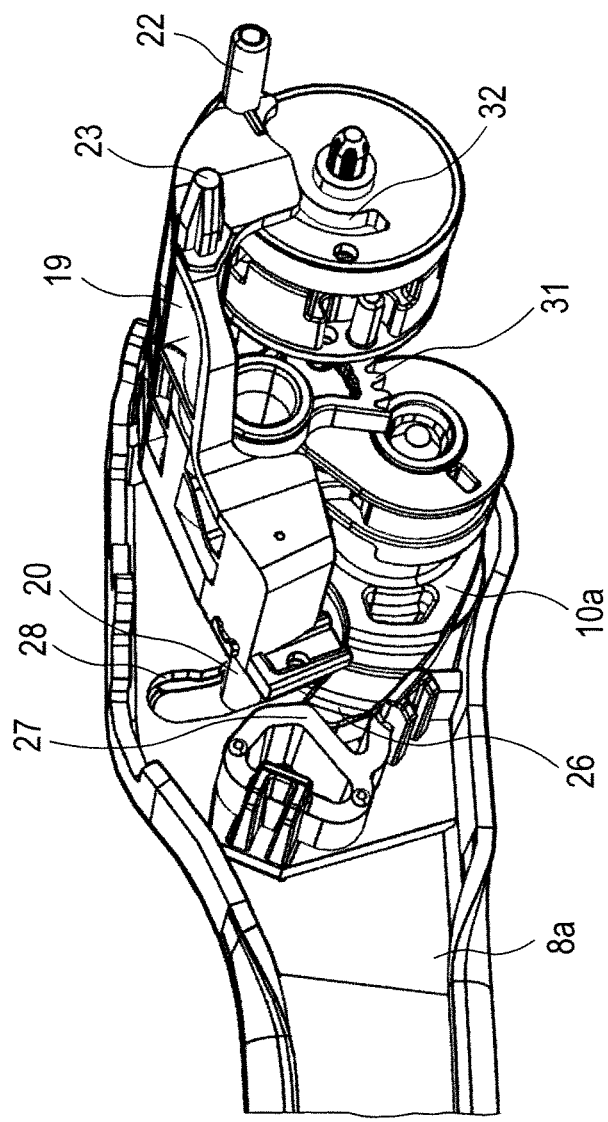
FIG. 6a shows another perspective illustration similar to FIG. 5 with a support plate of the carrier arm being omitted.
Figure 6B:
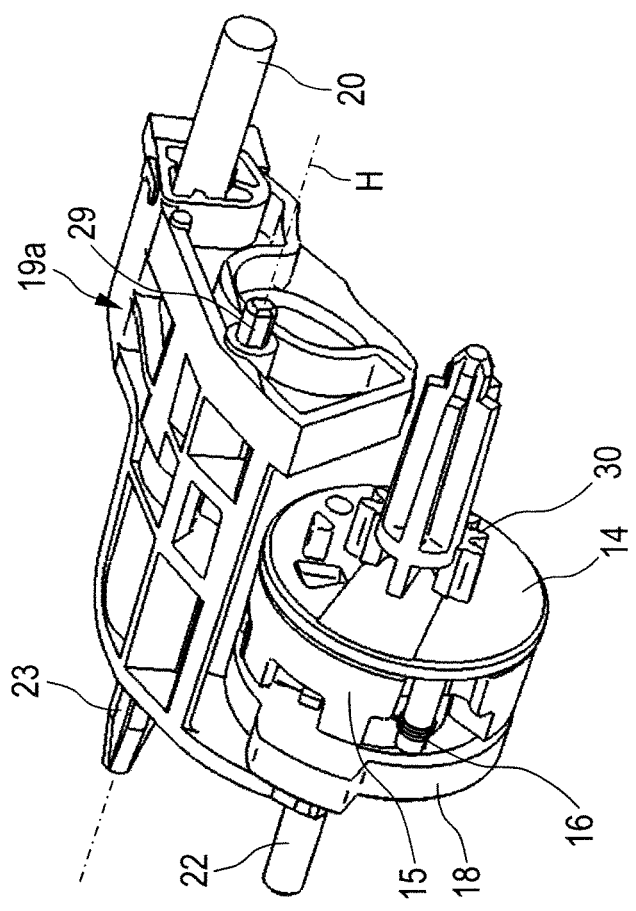
Figure 7:
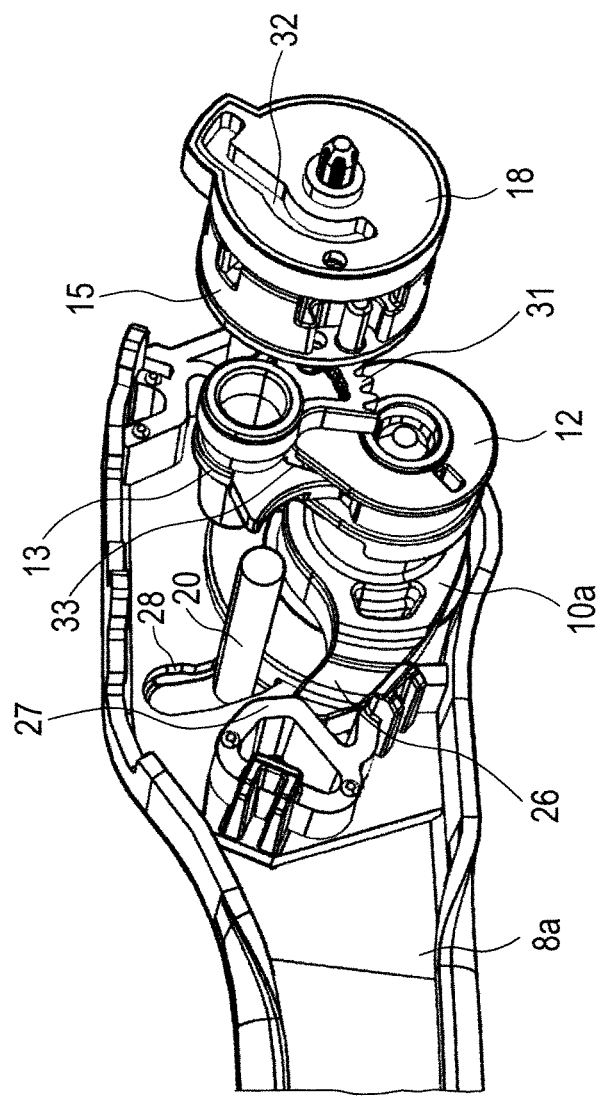
FIG. 7 shows a perspective illustration of additional part-regions of the support structure according to FIGS. 3 to 6b with additional functional components being omitted.
Figure 8:
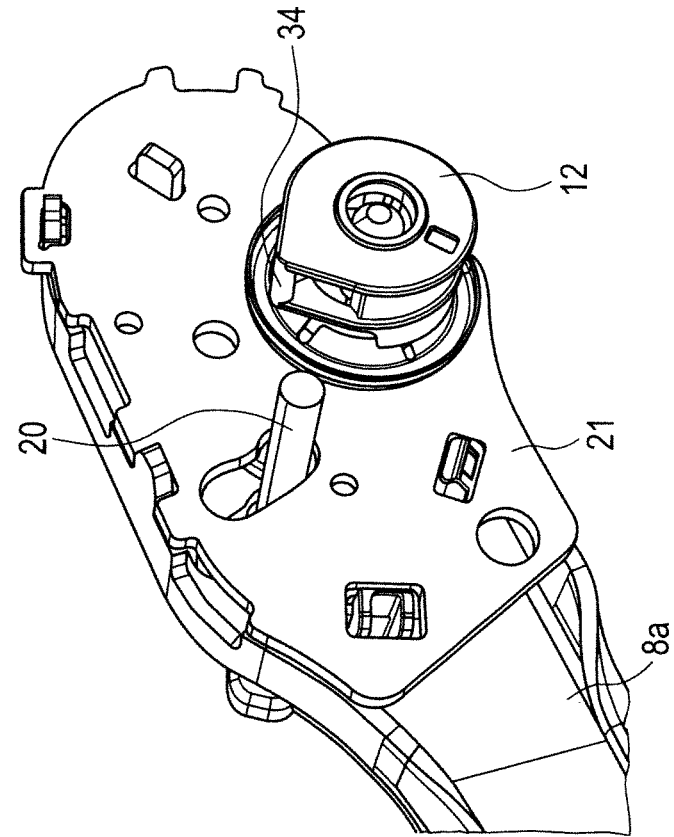
FIGS. 8 and 9 show the part-region of the support structure according to FIG. 7 with additional functional components being omitted in each case.
Figure 9:
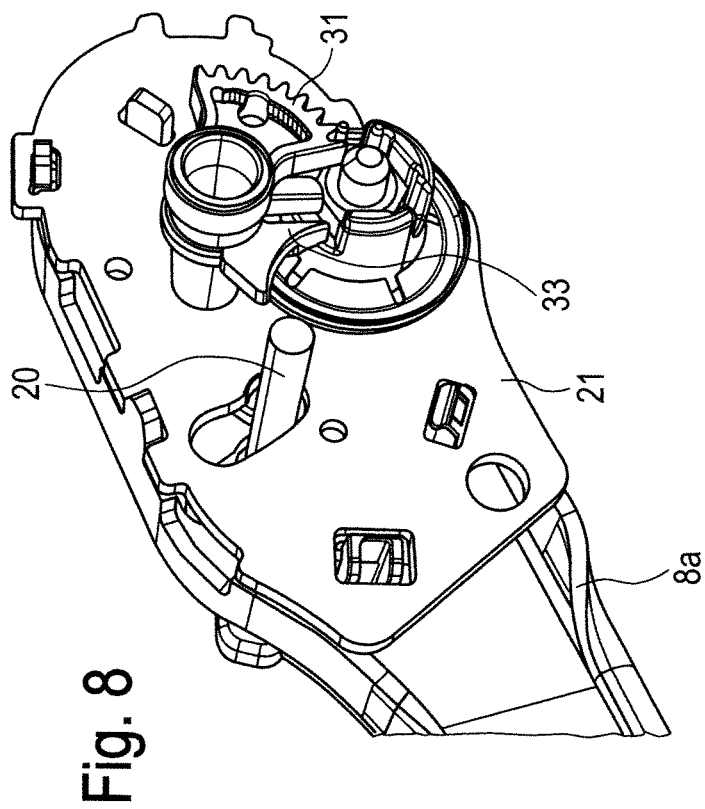
Figure 10:
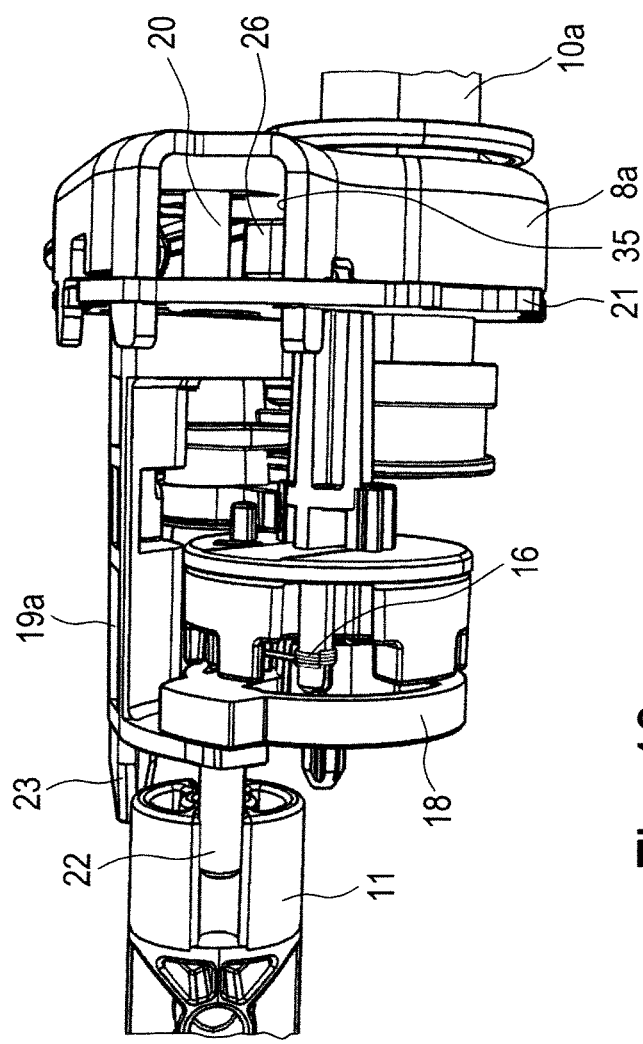

As can be clearly seen in FIGS. 6a and 7, there is associated with the carrier arm 8a and the carrier arm 8b an end position catch 27 which is in each case securely connected at the inner side to the carrier arm 8a, 8b and which has a slightly resiliently flexible locking projection which cooperates with a front end of the stop 26 of each axle carrier continuation 10a, 10b. The end position catch 27 is provided for the upright rest position of the support structure 5 and ensures, both when the support structure 5 is pivoted upward from the operating position in the direction of the rest position and during an initial pivoting downward of the support structure 5 from the rest position in the direction of the operating position, a briefly increased application of force which signals to an operator that the end position has been reached or left. The increased frictional connection consequently gives the operator an impression of a high-quality mechanical function and in addition a haptically detectable certainty that the upper end position has been reached or the upper end position has been left.

The invention claimed is:

1. An armrest arrangement for a vehicle seat structure of a motor vehicle having, in an operationally completely mounted state, a support structure secured to the vehicle, two carrier arms supported so as to be pivotably movable relative to the support structure about a pivot axis, a module housing associated with a first of the two carrier arms and spaced from a second of the two carrier arms, and a blocking device acting between the support structure and the first carrier arm, the blocking device being activated by a mechanical control unit in order to block a pivot movement of the first carrier arm, wherein the mechanical control unit cooperates with the blocking device depending on an acceleration or speed of the pivot movement, wherein the mechanical control unit and the blocking device are accommodated in the module housing, wherein the support structure includes first and second carrier elements respectively supporting the first and second carrier arms in a pivotably movable manner, the first and second carrier elements supporting the respective first and second carrier arms spaced apart from each other so as to be separated from each other along the pivot axis, wherein the second carrier arm is provided with a blocking device similar to the blocking device for the first carrier arm and coupled by a synchronization axle to the blocking device of the first carrier arm, wherein the synchronization axle is radially spaced from the pivot axis and extends parallel to the pivot axis.

2. The armrest arrangement according to claim 1, wherein there is associated with the second carrier arm a housing enclosure surrounding the blocking device of the second carrier arm and spaced apart with respect to the module housing of the first carrier arm.

3. The armrest arrangement according to claim 1, wherein the blocking devices of the first and second carrier arms each include a pivotably movable blocking lever having a blocking element, the blocking lever of the second carrier arm is articulated to the second carrier arm, and the synchronization axle couples the blocking lever of the second carrier arm to the blocking lever of the first carrier arm in a rotationally secure manner.

4. The armrest arrangement according to claim 1, wherein the first carrier arm has an end position catch acting in a force-limited manner and being resiliently flexible; and the end position catch securing the first carrier arm in at least one end position of the first carrier arm.

5. An armrest arrangement for a vehicle seat structure of a motor vehicle having, in an operationally completely mounted state, a support structure secured to the vehicle, two carrier arms supported so as to be pivotably movable relative to the support structure about a pivot axis, and a blocking device acting between the support structure and at least one of the two carrier arms, the blocking device being activated by a mechanical control unit in order to block a pivot movement of the at least one carrier arm, wherein the mechanical control unit cooperates with the blocking device depending on an acceleration or speed of the pivot movement, wherein the support structure includes first and second carrier elements respectively supporting the two carrier arms in a pivotably movable manner, the first and second carrier elements supporting the respective two carrier arms spaced apart from each other so as to be separated from each other along the pivot axis, wherein the mechanical control unit has a stepping gear mechanism configured to bring about a stepped pivot transmission of the at least one carrier arm to the blocking device, wherein the stepping gear mechanism comprises a stepping gear mechanism segment and is active over a pivot range of up to 90°.

6. The armrest arrangement according to claim 5, further including a step-up gear mechanism segment arranged downstream of the stepping gear mechanism segment and configured to bring about, over the pivot range of the stepping gear mechanism segment, an increase of a rotation speed of a functional component associated with the blocking device.

7. The armrest arrangement according to claim 6, wherein the step-up gear mechanism segment comprises spur gear segments meshing with each other and configured such that a speed step-up is achieved.

8. The armrest arrangement according to claim 7, further including an inertia coupling operationally connected to the blocking device, the inertia coupling being arranged downstream of the step-up gear mechanism segment.

9. The armrest arrangement according to claim 8, wherein the blocking device includes a blocking lever having a blocking element and the armrest arrangement further includes a slotted control member associated with the inertia coupling for a pivotably movable deflection of the blocking lever, the blocking element, depending on movement transmissions of the mechanical control unit, blocking or releasing the at least one carrier arm for a pivot movement relative to the support structure.

10. The armrest arrangement according to claim 9, further including a top dead center spring associated with the blocking lever, the top dead center spring applying to the blocking lever, in an intermediate position, a torque in a direction of a blocking position or in a direction of a release position depending on a dead center position of the intermediate position being reached.

11. The armrest arrangement according to claim 9, wherein the first or second carrier element supporting the at least one carrier arm has a stop protruding radially with respect to the pivot axis and the blocking element strikes or pivots past the stop depending on a pivot position of the blocking lever.

12. The armrest arrangement according to claim 5, wherein the stepping gear mechanism comprises a Geneva gear mechanism.

13. An armrest arrangement for a motor vehicle, the armrest arrangement comprising:
  a support structure, the support structure being stationarily fixed to a seat structure of the motor vehicle in an operational state of the armrest arrangement, the support structure comprising first and second bearing flanges disposed in spaced-apart relation with one another and together defining a pivot axis extending therebetween, the first and second bearing flanges being free of connection to one another coaxially along the pivot axis;
  first and second carrier elements disposed in spaced-apart relation with one another, the first carrier element being stationarily fixed to the first bearing flange and the second carrier element being stationarily fixed to the second bearing flange;
  first and second carrier arms, the first carrier arm being supported entirely on the first carrier element for pivoting movement about the pivot axis, the second carrier arm being supported entirely on the second carrier element for pivoting movement about the pivot axis, the first and second carrier elements supporting the respective first and second carrier arms such that the first and second carrier arms are spaced-apart from one another in a direction substantially parallel to the pivot axis;
  a blocking device acting between the support structure and at least one of the first carrier arm or the second carrier arm;
  a mechanical control unit cooperating with the blocking device, the blocking device being activatable by the mechanical control unit to block a pivoting movement of the at least one first or second carrier arm about the pivot axis based on an acceleration or speed of the pivoting movement of the at least one first or second carrier arm about the pivot axis; and
  an armrest member configured at least for accommodating an arm of a vehicle occupant, the armrest member being operatively connected to and supported on the first and second carrier arms for pivoting movement about the pivot axis, the first and second carrier arms, radially outwardly from the pivot axis, being supported relative to one another in a direction substantially parallel with the pivot axis solely by the armrest member.

14. The armrest arrangement according to claim 13, wherein the blocking device is a first blocking device and the armrest arrangement comprises a second blocking device acting between the support structure and the second carrier arm for blocking movement of the second carrier arm, the armrest arrangement further comprising a synchronization axle coupling the first blocking device to the second blocking device and being radially spaced from the pivot axis.

15. An armrest arrangement for a motor vehicle, the armrest arrangement comprising:
  a support structure, the support structure being stationarily fixed to a seat structure of the motor vehicle in an operational state of the armrest arrangement, the support structure comprising first and second bearing flanges disposed in spaced-apart relation with one another and together defining a pivot axis extending therebetween, the first and second bearing flanges being free of connection to one another coaxially along the pivot axis;
  first and second carrier elements disposed in spaced-apart relation with one another, the first carrier element being stationarily fixed to the first bearing flange and the second carrier element being stationarily fixed to the second bearing flange;
  first and second carrier arms, the first carrier arm being supported on the first carrier element for pivoting movement about the pivot axis, the second carrier arm being supported on the second carrier element for pivoting movement about the pivot axis, the first and second carrier elements supporting the respective first and second carrier arms such that the first and second carrier arms are spaced-apart from one another in a direction substantially parallel to the pivot axis to define a space therebetween;
  an armrest member configured at least for accommodating an arm of a vehicle occupant and being supported on the first and second carrier arms for pivoting movement about the pivot axis, the first and second carrier arms, radially outwardly from the pivot axis, being supported relative to one another in a direction substantially parallel with the pivot axis by the armrest member;
  a blocking device acting between the support structure and at least one of the first or second carrier arms; and
  a mechanical control unit cooperating with the blocking device, the blocking device being activatable by the mechanical control unit to block a pivoting movement of the at least one first or second carrier arm about the pivot axis based on an acceleration or speed of the pivoting movement of the at least one first or second carrier arm about the pivot axis.

* * * * *